United States Patent [19]

Sjogren

[11] 4,162,710
[45] Jul. 31, 1979

[54] LOG TRUCK SCALE PAD AND POP-OFF VALVE

[75] Inventor: Fred E. Sjogren, Coos Bay, Oreg.

[73] Assignees: Kenneth A. Sjogren, Coquile; Alan L. Sjogren; Glenda J. Sjogren, both of Coos Bay, all of Oreg.; part interest to each

[21] Appl. No.: 854,311

[22] Filed: Nov. 14, 1977

[51] Int. Cl.$^2$ .................. G01G 19/10; G01G 5/04
[52] U.S. Cl. ................................ 177/141; 177/208
[58] Field of Search ............... 177/141, 208; 137/532, 137/533, 533.21, 538

[56] References Cited

U.S. PATENT DOCUMENTS

| | | | |
|---|---|---|---|
| 2,501,730 | 3/1950 | McClure | 137/538 |
| 3,327,795 | 6/1967 | Link | 177/208 |
| 3,456,749 | 7/1969 | Smieja | 177/208 X |
| 3,695,100 | 10/1972 | Mitchell | 177/208 X |

*Primary Examiner*—George H. Miller, Jr.
*Attorney, Agent, or Firm*—Clarence A. O'Brien; Harvey B. Jacobson

[57] ABSTRACT

A horizontal table is provided including a depending central support portion for rigid support from a vehicle mounting portion. An upper top plate including a downwardly directed peripheral flange is centered over the table and a diaphragm is sealingly secured to and extends between remote portions of the peripheral flange below the top plate and overlies and is supported from the table. The top plate and table include coacting structure guiding the top plate from the table for vertical movement relative thereto, limited horizontal shifting relative thereto and limited canting in all directions about a central zone of the table. A vertically elongated pop-off valve assembly is sealingly secured through a central portion of the table and includes an upwardly projectable piston plunger engageable with the underside of the top plate in response to the valve assembly being charged at its lower end and the assembly includes structure operative to vent the assembly to the ambient atmosphere in response to upward movement of the plunger to a predetermined level and to close the assembly against venting to the ambient atmosphere upon lowering of the plunger below the aforementioned predetermined level.

7 Claims, 2 Drawing Figures

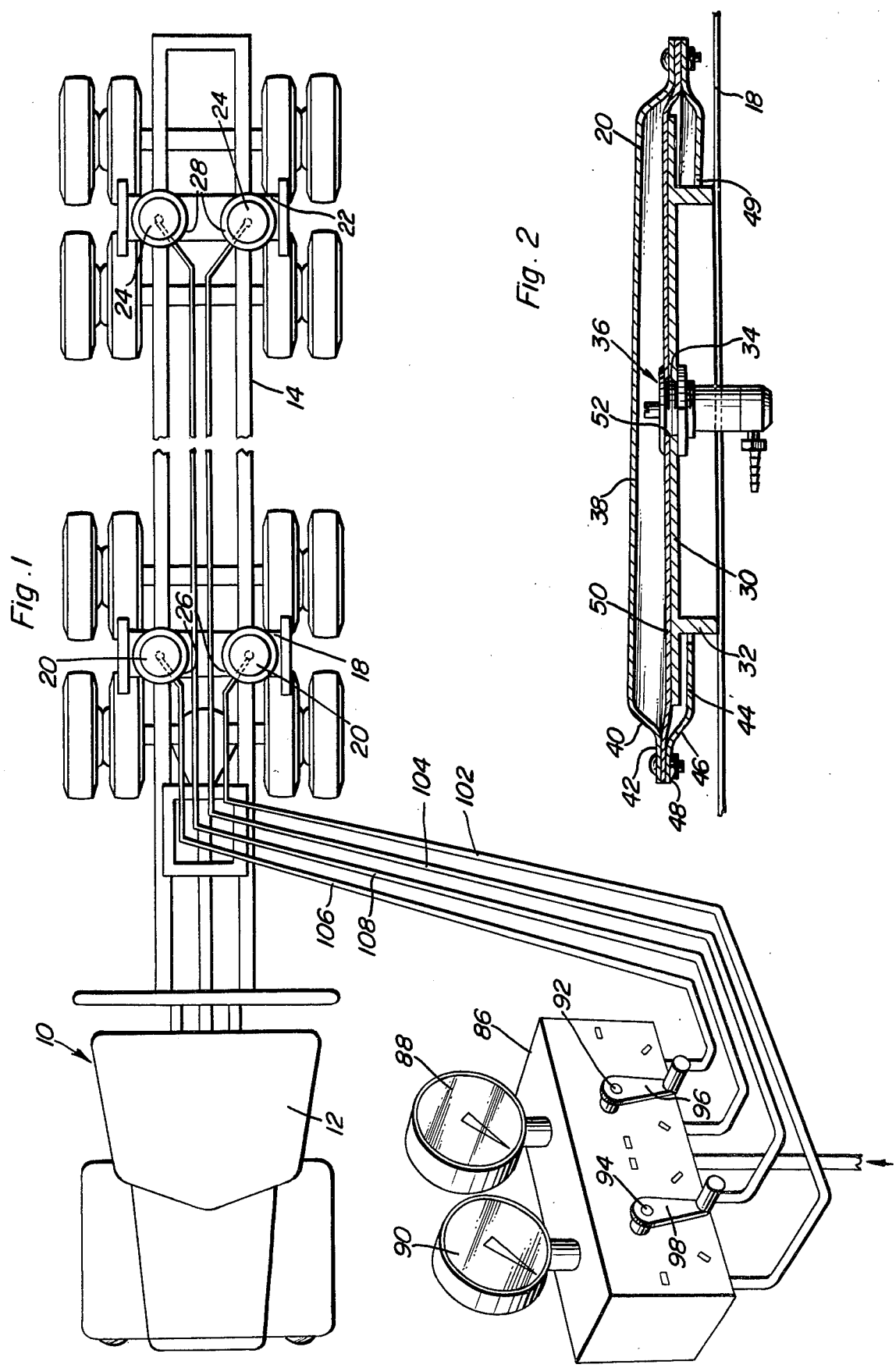

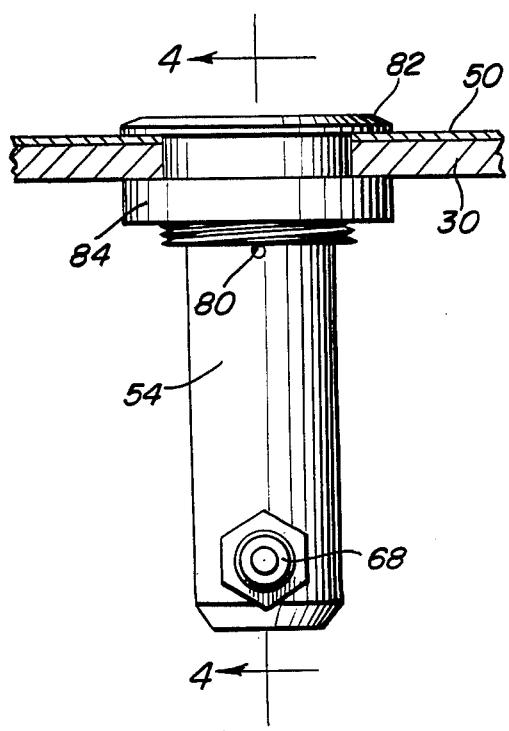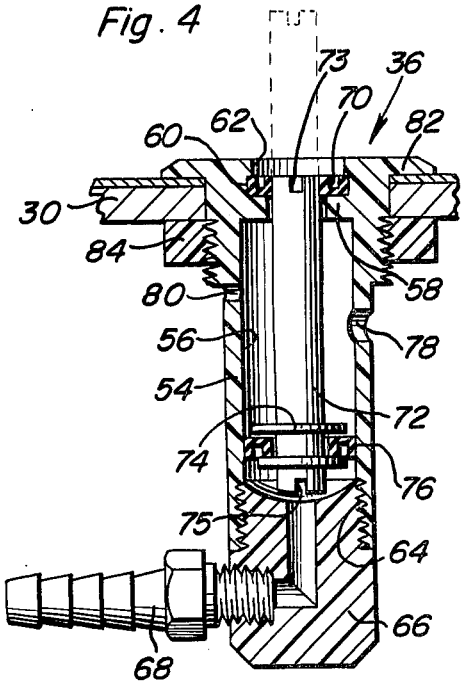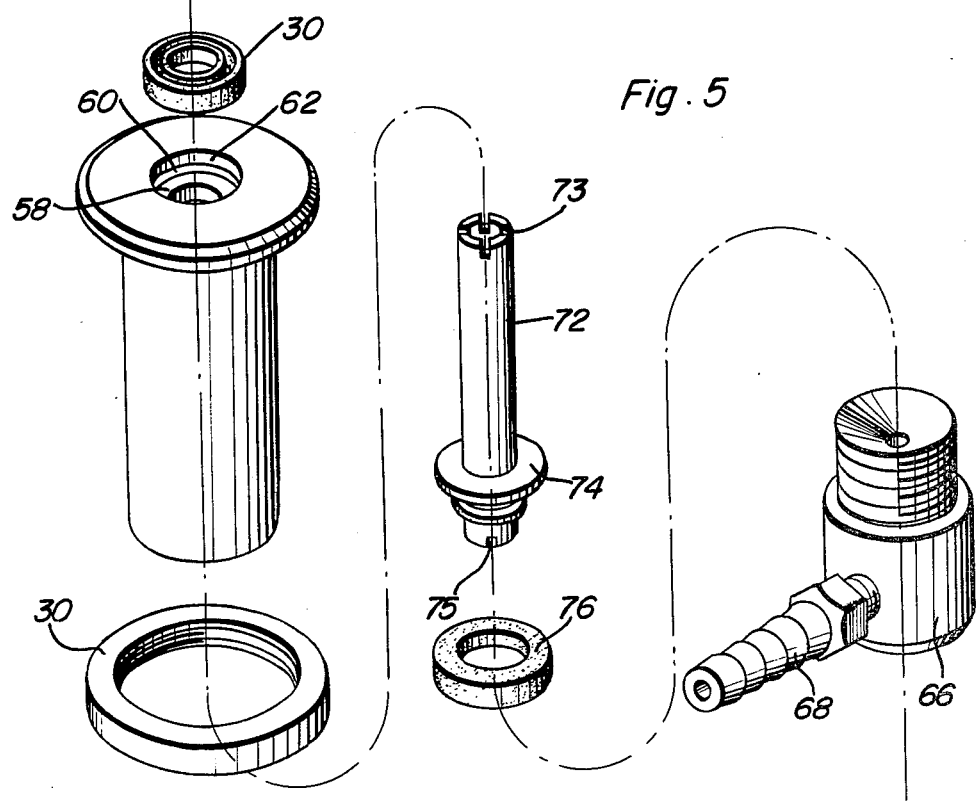

LOG TRUCK SCALE PAD AND POP-OFF VALVE

BACKGROUND OF THE INVENTION

A regular logging truck is equipped with four scale pads, two of which are on the tractor and two of which are on the trailer. The tractor includes a log bunk pivotally supported therefrom and with a pair of scale pads disposed beneath opposite sides of the tractor log bunk. The trailer is also equipped with a log bunk and trailer scale pads are disposed under opposite sides of the trailer log bunk. The scale pads, when pressurized, elevate the log bunks and the load supported therefrom. The scale pads are pneumatically operated and are constructed to vent to the ambient atmosphere after being elevated a predetermined amount. As long as the tractor and trailer are disposed on reasonably level ground, the pressure required to maintain the scale pads elevated below their maximum elevation may be transposed into weight readings whereby the load supported from the bunks may be determined. However, in most instances, the areas in which the trucks are loaded with logs are not level resulting in uneven loading on the scale pads and if the scale pads are tilted and equipped with conventional side mounted pop-off valves, one pad will render a light reading, but in reality the true weight will be greater. The reason for this inaccurate weight reading is because the conventional side mounted pop-off valve is allowed to vent to the ambient atmosphere short of its lift. If a conventional scale pad is tilted downward on the side of the conventional side mounted pop-off valve, the weight reading will be light. The reason for this is that the scale pad is forced to travel further in order to vent to the ambient atmosphere. As a result, the scale pad is over-pressurized and thereby renders a heavy weight reading.

Accordingly, a need exists for scale pads which will be capable of rendering a true reading of the loading on corresponding log bunks, even if the truck being loaded is disposed on uneven ground.

Various forms of previously known scale pads and similar structures are disclosed in U.S. Pat. Nos. 2,020,307, 2,482,027, 2,646,272, 2,826,404, 2,867,432, 2,906,492 and 3,376,793.

BRIEF DESCRIPTION OF THE INVENTION

The scale pad of the instant invention utilizes a centrally located pop-off valve. Therefore, the top plates of a pair of scale pads supporting a log bunk from a truck disposed on uneven ground may cant relative to the supporting portion of the truck about a central area of the top plates of the pads and the latter may be substantially equally elevated during a weight reading operation in order to enable each of the scale pads supporting a log bunk to render a substantially true weight reading.

The main object of this invention is to provide a scale pad for use in pairs to support a log bunk and which are constructed in a manner whereby pneumatic actuation of the scale pads while an associated truck is on uneven ground may render true weight readings and thus reduce the occurrence of overloading logging trucks without obviously underloading the logging trucks.

Another object of this invention is to provide an improved pop-off valve for a scale pad.

Yet another important object of this invention is to provide a scale pad utilizing a centrally disposed pop-off valve.

A final object of this invention to be specifically enumerated herein is to provide an improved log truck scale pad and pop-off valve assembly in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic top plan view of a logging truck illustrating a first pair of scale pads supported from the tractor, a second pair of scale pads supported from the trailer and a control valve assembly for the tractor and trailer scale pads illustrated in perspective;

FIG. 2 is a vertical sectional view taken substantially upon a plane passing through the center of one of the scale pads with the pad pneumatically actuated and the top plate thereof canted relative to the associated vehicle portion from which the scale pad is supported;

FIG. 3 is a fragmentary enlarged elevational view of the pop-off valve of one of the scale pads in operative mounted position relative to the table and diaphragm of the corresponding scale pad and with the table and diaphragm illustrated in vertical section;

FIG. 4 is a vertical sectional view taken substantially upon the plane indicated by the section line 4—4 of FIG. 3; and FIG. 5 is an exploded perspective view of the pop-off valve illustrated in FIGS. 3 and 4.

DETAILED DESCRIPTION OF THE INVENTION

Referring now more specifically to the drawings, the numeral 10 generally designates a logging truck including a tractor 12 and a trailer 14. The tractor 12 includes a transverse mounting portion 18 from which a pair of scale pads referred to in general by the reference numerals 20 are supported and the trailer 14 includes a transverse mounting portion 22 from which a pair of scale pads 24 are supported.

Conventionally, scale pads similar to the scale pads 20 and 24 are provided with peripherally mounted pop-off valves at 26 and 28, respectively.

The scale pads 20 and 24 of the instant invention are identically constructed and, accordingly, only one of the scale pads 20 will be discussed in detail. The scale pad 20 includes a circular table 30 including a depending cylindrical support portion 32 secured in any convenient manner at its lower end to the mounting portion 18. The cylindrical support portion 32 is coaxial with the circular table 30 and the center of the table 30 has an opening 34 formed therein through which the pop-off valve assembly 36 of the scale pad 20 is secured.

The scale pad 20 further includes a circular top plate 38 including a downwardly and outwardly inclined peripheral flange 40 terminating downwardly in an integral annular mounting flange 42. A lower plate 44 of generally the same configuration but inverted and, therefore, including an upwardly and outwardly inclined peripheral flange 46 terminating upwardly in an annular mounting flange 48 is also provided and includes a large diameter central opening 49 therein which loosely receives the cylindrical support portion 32 therethrough, the lower plate 44 underlying the outer periphery of the table 30.

A circular diaphragm 50 has its outer periphery sealingly secured between the mounting flanges 42 and 48 and overlies the table 30. The central portion of the diaphragm 50 has an opening 52 formed therethrough in registry with the opening 34 and the pop-off valve assembly 36 is secured through the openings 34 and 52.

With attention now invited more specifically to FIGS. 3, 4 and 5 of the drawings, it may be seen that the pop-off valve assembly 36 includes a vertical cylinder 54 having a bore 56 formed therethrough and including an annular inwardly projecting rib 58 at its upper end portion. The cylinder 54 includes first and second large and small diameter counterbores 60 and 62 above the rib 58 and the lower end of the bore 56 is threaded as at 64 and has a right angle fitting 66 threaded therein. The fitting 66 includes an inlet nipple 68 opening horizontally outwardly therefrom for a purpose to be hereinafter more fully set forth.

A seal 70 is seated in the counterbore 60 between the rib 58 and the counterbore 62 and a tubular piston plunger 72 is disposed in the bore 56 and has its upper end reciprocal through the seal 70, the upper and lower ends of the plunger including radial slots 73 and 75, respectively. The lower end of the plunger 72 includes a piston 74 thereon provided with a seal 76 for forming a seal between the piston 74 and the bore 56. The lower position of the plunger 72 is illustrated in solid lines in FIG. 4 and the upper position thereof is illustrated in phantom lines in FIG. 4. The cylinder 54 includes an upper vent port 78 and a relief port 80 disposed above the vent port 78 to insure that ambient pressure is maintained within the bores 56 above the pistons 74.

When the plunger 72 is in its lower position, the upper end thereof is disposed below the diametrically enlarged head 82 of the cylinder 54 which overlies the diaphragm 50 and the table 30 and the portion of the cylinder 54 disposed immediately beneath the table 30 is externally threaded and has a retaining nut 84 threaded thereon to thereby clamp the central portion of the diaphragm 50 between the head 82 and the table 30.

With attention now invited more specifically to FIG. 1 of the drawings, a valve assembly referred to in general by the reference numeral 86 is disposed within the cab of the tractor 12 and includes a pair of air pressure gauges 88 and 90 and a pair of corresponding valves 92 and 94 provided with oscillatable actuators 96 and 98. A pair of lines 102 and 104 extend from the left scale pads 20 and 24 of the tractor and trailer 12 and 14 to the valve 94 and a pair of lines 106 and 108 extend from the right pads 20 and 24 of the tractor 12 and trailer 14 to the valve 92, the valve assembly 86 and the lines 102, 104, 106 and 108 being conventional.

Although not illustrated, a log bunk is supported from and extends between the top plates 38 of the scale pads 20 and a second log bunk is supported from and extends between the top plates 38 of the scale pads 24.

In operation, when the truck 10 has been loaded, the operator of the truck turns actuators 96 and 98 ninety degrees in a clockwise direction which effects pressurization of both truck scale pads 20 simultaneously allowing them to rise until they reach their limit of travel as the piston seals 76 are elevated past the vent ports 78 and the bores 56, below the pistons 74, are vented to the ambient atmosphere through the vent ports 78. At this point, the operator of the truck 12 moves the actuators 96 and 98 forty-five degrees counterclockwise to close the lines 102 and 106 and the pistons drop slightly to close the vent posts 78 after which the gauges 88 and 90 may be read and their readings may be added together to determine the load supported from the scale pads 20. Then, the operator may again turn the actuators 96 and 98 forty-five degrees counterclockwise to their original positions whereby the lines 102 and 106 will be vented through the valve assembly 86 allowing the scale pads 20 to be lowered. Thereafter, the actuators 96 and 98 are turned counterclockwise from the positions thereof illustrated in FIG. 1 ninety degrees to pressurize the scale pads 24 through the lines 104 and 108. After the scale pads 24 have reached their limit of travel, the actuators 96 and 98 are turned forty-five degrees clockwise and the readings of the gauges 88 and 90 are added together and the sum of these readings is added to the sum of the previous readings in order to determine the total weight supported by the truck 12. Thereafter, the actuators 96 and 98 are further turned clockwise forty-five degrees so as to return them to the positions thereof illustrated in FIG. 1 of the drawings whereby the lines 104 and 108 will be vented.

Because the top plate 38 may cant about its central area relative to the table 30 in the manner illustrated in FIG. 2 and the pop-off valve assemblies 36 are centrally located with respect to the top plate 38, substantially accurate readings will be rendered by all of the scale pads 20 and 24 to eliminate unwanted overloading of the truck 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A scale pad for a log bunk, said pad including a horizontal table including a central portion and a support portion for rigid support from an underlying vehicle mounting portion, an upper top plate including a downwardly directed peripheral flange and centered over said table, a diaphragm sealingly secured to and extending between remote portions of said peripheral flange below said top plate and overlying and supported from said table and sealingly secured thereto about said central portion, said top plate and table including coacting means guiding said top plate from said table for vertical movement relative thereto, limited horizontal shifting relative thereto and limited canting relative thereto in all directions about a central zone of said table, and a vertically elongated pop-off valve assembly sealingly secured through said central portion of said table, including a central upstanding and upwardly projectable tubular piston plunger engageable with the underside of said top plate and projectable upwardly in response to said valve assembly being charged at its lower end below said plunger, said assembly including vent means operative to vent said assembly, below said piston plunger, to the ambient atmosphere in response to upward movement of said plunger beyond a predetermined level and to close said assembly against venting to the ambient atmosphere upon lowering of said plunger below said predetermined level.

2. The combination of claim 1 wherein said diaphragm is constructed of flexible material and said table is of substantially the same plane area as said top plate.

3. The combination of claim 2 wherein said peripheral flange terminates downwardly in an outwardly projecting annular mounting flange, the outer peripheral portion of said diaphragm being sealingly anchored to and underlying said mounting flange.

4. The combination of claim 3 wherein said scale pad includes an annular lower plate, the outer periphery of said lower plate terminating outwardly in an upwardly directed peripheral flange in turn terminating upwardly in an outwardly projecting annular mounting flange, said outer peripheral portion of said diaphragm being clamped between said mounting flanges, said lower plate having a central opening formed therein through which said support portion is loosely received.

5. The combination of claim 4 wherein said pop-off valve assembly includes an upstanding cylinder sleeve sealingly secured upwardly and centrally through said table and diaphragm, said piston plunger being reciprocally received in said cylinder and including a lower end piston sealingly slidable in said sleeve and an upper end portion sealingly slidable through the upper end of said sleeve for abutting engagement with the underside of said table, said sleeve including a lower end and an inlet below said piston and an upper vent port above said inlet and below the upper limit of travel in said sleeve comprising said vent means.

6. The combination of claim 5 wherein said sleeve includes a relief passage above said vent port.

7. A pop-off valve assembly for use in a scale pad, said assembly including an elongated upstanding sleeve having air inlet means at its lower end, a tubular piston plunger reciprocally received in said sleeve and including a piston thereon between said inlet means and the upper end of said sleeve sealingly slidable in said sleeve, the upper end of said plunger being sealingly slidable through the upper end of said sleeve end, a vent port in said sleeve between said inlet means and said upper sleeve end, said sleeve including a relief passage between said vent port and said upper sleeve end.

* * * * *